US00RE49648E

(19) United States
(12) Reissued Patent
Coresh

(10) Patent Number: US RE49,648 E
(45) Date of Reissued Patent: Sep. 12, 2023

(54) RAZOR CARTRIDGE WITH REDUCED PART COUNT AND EXPANDED RANGE OF MOTION

(71) Applicant: Rolling Razor, Inc, Los Angeles, CA (US)

(72) Inventor: Leon Coresh, Tel Aviv (IL)

(73) Assignee: Rolling Razor, Inc, Los Angeles, CA (US)

(21) Appl. No.: 16/688,142

(22) Filed: Nov. 19, 2019

Related U.S. Patent Documents

Reissue of:
(64) Patent No.: 9,821,480
Issued: Nov. 21, 2017
Appl. No.: 14/853,735
Filed: Sep. 14, 2015

U.S. Applications:
(63) Continuation of application No. 13/173,911, filed on Jun. 30, 2011, now Pat. No. 9,144,914.

(51) Int. Cl.
*B26B 21/22* (2006.01)
*B26B 21/40* (2006.01)
*B26B 21/44* (2006.01)

(52) U.S. Cl.
CPC ..... *B26B 21/225* (2013.01); *B26B 21/4068* (2013.01); *B26B 21/443* (2013.01); *B26B 21/22* (2013.01)

(58) Field of Classification Search
CPC ... B26B 21/225; B26B 21/22; B26B 21/4012; B26B 21/4037; B26B 21/4068; B26B 21/443
See application file for complete search history.

(56) References Cited

U.S. PATENT DOCUMENTS 3,092,904 A * 6/1963 Bruecker ..... B26B 19/044 30/34.1
3,137,940 A * 6/1964 Curci ..... B26B 21/24 30/50
3,138,865 A 6/1964 Meyer
3,412,464 A * 11/1968 Keck ..... B26B 21/00 30/50
3,935,639 A * 2/1976 Terry ..... B26B 21/225 30/47

(Continued)

FOREIGN PATENT DOCUMENTS

CA 2356571 A1 * 4/2002 ..... B26B 21/225
CA 2942900 A1 * 9/2015 ..... B26B 21/521

(Continued)

OTHER PUBLICATIONS

Non-Final Office Action in U.S. Appl. No. 13/801,883 dated Dec. 10, 2015. 11 pages.

(Continued)

*Primary Examiner* — David O Reip
(74) *Attorney, Agent, or Firm* — Thomas Coester Intellectual Property

(57) ABSTRACT

A shaving razor having a cartridge containing a razor blade coupled to a monolithic yoke. The yoke is formed from a single piece of material possibly by injection molding. The yoke has a bridge and a pair of cross pieces each coupled to the bridge by a living hinge. The cartridge is coupled to the cross pieces and spans between the cross pieces.

15 Claims, 14 Drawing Sheets

(56) References Cited

U.S. PATENT DOCUMENTS 4,094,063 A * 6/1978 Trotta ..... B26B 21/521 30/47
4,170,821 A 10/1979 Booth
4,392,303 A * 7/1983 Ciaffone ..... B26B 21/521 30/527
4,459,744 A * 7/1984 Esnard ..... B26B 21/14 30/49
4,461,078 A * 7/1984 Carreker ..... B26B 21/40 30/47
4,501,066 A * 2/1985 Sceberras ..... B26B 21/22 30/47
4,516,320 A 5/1985 Peleckis
4,534,110 A * 8/1985 Glass ..... B26B 21/20 30/50
4,720,917 A * 1/1988 Solow ..... B26B 21/4012 30/51
4,932,122 A 6/1990 Shurland et al.
4,989,328 A * 2/1991 Sokoloff ..... B26B 21/00 30/34.1
4,993,153 A * 2/1991 Henry ..... B26B 21/16 30/50
5,038,472 A * 8/1991 Iderosa ..... B26B 21/521 30/51
5,152,064 A 10/1992 Johnston
D343,922 S * 2/1994 Ahlgren ..... D28/46
5,307,564 A * 5/1994 Schoenberg ..... B26B 21/14 30/47
5,343,622 A * 9/1994 Andrews ..... B26B 21/00 30/50
5,426,853 A 6/1995 McNinch
5,546,660 A * 8/1996 Burout ..... B26B 21/227 30/48
5,711,076 A * 1/1998 Yin ..... B26B 21/4018 30/34.2
5,781,997 A 7/1998 Ferraro et al.
5,953,825 A * 9/1999 Christman ..... B26B 21/225 30/50
6,052,905 A * 4/2000 Branchinelli ..... B26B 21/4006 30/34.1
6,082,007 A * 7/2000 Andrews ..... B26B 21/00 30/47
6,125,857 A * 10/2000 Silber ..... B26B 21/00 30/34.1
6,141,875 A * 11/2000 Andrews ..... B26B 21/00 30/50
6,161,288 A * 12/2000 Andrews ..... B26B 21/00 30/50
6,212,777 B1 4/2001 Gilder et al.
6,243,951 B1 6/2001 Oldroyd
6,308,416 B1 * 10/2001 Bosy ..... B26B 21/225 30/50
6,311,400 B1 * 11/2001 Hawes ..... B26B 21/225 30/50
6,397,473 B1 6/2002 Clark
6,434,828 B1 * 8/2002 Andrews ..... B26B 21/00 30/50
6,493,950 B1 * 12/2002 Kludjian ..... B26B 21/22 30/50
6,550,148 B2 * 4/2003 Cecil ..... B26B 21/527 30/50
6,694,626 B2 * 2/2004 Kludjian ..... B26B 21/22 30/526
6,880,253 B1 4/2005 Gyllerstrom
6,973,730 B2 * 12/2005 Tomassetti ..... B26B 21/446 30/527
7,086,160 B2 * 8/2006 Coffin ..... B26B 21/222 30/50
7,111,401 B2 9/2006 Richard
7,131,203 B2 * 11/2006 Wain ..... B26B 21/227 30/50
7,200,938 B2 * 4/2007 Lembke ..... B26B 21/227 30/50
7,210,229 B2 5/2007 Coffin
7,721,451 B2 * 5/2010 Psimadas ..... B26B 21/22 30/50
8,024,863 B2 * 9/2011 Wain ..... B26B 21/227 30/50
D654,222 S * 2/2012 Coresh ..... D28/48
8,479,398 B2 * 7/2013 Coresh ..... B26B 21/22 30/34.1
8,595,940 B2 * 12/2013 Coresh ..... B26B 21/22 30/34.1
8,671,576 B1 * 3/2014 Hotella ..... B26B 21/4012 30/34.1
8,707,561 B1 * 4/2014 Kneier ..... B26B 19/42 30/50
9,144,914 B2 * 9/2015 Coresh ..... B26B 21/22 30/50
9,289,908 B2 * 3/2016 Marder ..... B26B 21/225 30/34.1
9,457,486 B2 * 10/2016 Coresh ..... B26B 21/4031 30/77
9,616,584 B2 * 4/2017 Coresh ..... B26B 21/521 30/526
9,630,332 B2 * 4/2017 Coresh ..... B26B 21/38 30/50
2002/0023352 A1 * 2/2002 Mil'shtein ..... B26B 21/222 30/50
2002/0050065 A1 * 5/2002 Kludjian ..... B26B 21/22 30/50
2004/0128835 A1 * 7/2004 Coffin ..... B26B 21/14 30/50
2004/0181949 A1 9/2004 Coffin et al.
2005/0188539 A1 9/2005 Prudden
2005/0198843 A1 9/2005 Royle
2006/0064875 A1 * 3/2006 Follo ..... B26B 21/4012 30/34.1
2006/0080839 A1 4/2006 Hesketh
2006/0143925 A1 7/2006 Johnson et al.
2006/0196054 A1 9/2006 Luxton
2007/0283567 A1 * 12/2007 Magli ..... B26B 21/22 30/34.1
2008/0196251 A1 8/2008 Royle
2009/0277023 A1 * 11/2009 Coelho ..... B26B 21/222 30/526
2009/0288299 A1 11/2009 Denkert
2011/0016724 A1 1/2011 Murgida
2011/0192031 A1 * 8/2011 Coresh ..... B26B 21/227 30/50
2012/0030948 A1 2/2012 Walker, Jr. et al.
2012/0151772 A1 * 6/2012 Moon ..... B26B 21/225 30/50
2012/0324733 A1 * 12/2012 Coresh ..... B26B 21/227 30/50
2013/0000127 A1 * 1/2013 Coresh ..... B26B 21/22 30/50
2013/0152400 A1 * 6/2013 Nunez ..... B26B 21/523 30/47
2014/0259679 A1 * 9/2014 Tracy ..... B26B 21/225 30/50
2014/0366361 A1 * 12/2014 Wain ..... B26B 21/44 29/453
2014/0366380 A1 * 12/2014 Good ..... B26B 21/443 30/41
2014/0366381 A1 * 12/2014 Phipps ..... B26B 21/4012 30/41
2015/0183119 A1 * 7/2015 Contaldi ..... B26B 21/522 30/50
2015/0266192 A1 * 9/2015 Coresh ..... B26B 21/521 30/526
2016/0001454 A1 * 1/2016 Coresh ..... B26B 21/22 30/50
2016/0089800 A1 * 3/2016 Coresh ..... B26B 21/38 30/45

(56) References Cited

U.S. PATENT DOCUMENTS

| | | | | |
|---|---|---|---|---|
| 2016/0193740 | A1* | 7/2016 | Phillips | B26B 21/527 30/34.05 |
| 2016/0288350 | A1* | 10/2016 | Contaldi | B26B 21/522 30/34.1 |
| 2017/0173808 | A1* | 6/2017 | Coresh | B26B 21/521 30/50 |

FOREIGN PATENT DOCUMENTS

| | | | | |
|---|---|---|---|---|
| CN | 1212647 | | 3/1999 | |
| CN | 1469797 | | 1/2004 | |
| DE | 19936129 | A1 * | 10/2000 | B26B 21/22 |
| DE | 102013008942 | A1 * | 12/2014 | B26B 21/225 |
| DE | WO 2016192743 | A1 * | 12/2016 | B25G 1/102 |
| EP | 0020816 | | 1/1981 | |
| EP | 1046472 | | 10/2000 | |
| EP | 1674220 | | 6/2006 | |
| FR | 2433396 | | 3/1980 | |
| FR | 2829716 | A1 * | 3/2003 | B26B 21/22 |
| FR | 2935920 | A1 * | 3/2010 | B26B 21/22 |
| GB | 2268434 | | 1/1994 | |
| GB | 2411141 | | 8/2005 | |
| GB | 2466139 | A | 6/2010 | |
| KR | 101082303 | B1 * | 11/2011 | B26B 21/225 |
| KR | 20140053107 | A * | 5/2014 | B26B 21/22 |
| WO | WO-0232632 | | 5/2002 | |
| WO | WO-2004087382 | | 10/2004 | |
| WO | WO-2005090020 | | 9/2005 | |
| WO | WO-2006/036591 | | 4/2006 | |
| WO | WO-2010010517 | | 1/2010 | |
| WO | WO 2013003484 | A3 * | 4/2013 | B26B 21/22 |
| WO | WO 2015142526 | A1 * | 9/2015 | B26B 21/521 |
| WO | WO 2016053664 | A1 * | 4/2016 | B26B 21/38 |

OTHER PUBLICATIONS

Search Report in European Patent Application No. 12803906.2 dated Jan. 22, 2016. 7 pages.

Search Report and Written Opinion dated Apr. 18, 2012 from the Intellectual Property Office of Singapore issued by the Australian Patent Office dated Mar. 12, 2012 re Application No. 201100416-5.

Communication Pursuant to Article 94(3) EPC dated May 30, 2012 From the European Patent Office re: Application No. 09786662.8 (May 30, 2012).

Patents Act 1977: Combined Search and Examination Report Under Sections 17 and 18(3) dated Nov. 18, 2008 from the UK (United Kingdom) Intellectual Property Office Re: Application No. GB0813364.7 (Nov. 18, 2008).

Examination Report dated Nov. 27, 2012 from the Eurasian Patent Organization re Application No. 201100263 and its translation into English.

Translation of Office Action dated Nov. 14, 2012 from the State Intellectual Property Office of the People's Republic of China re 200980136872.8.

Examination Report dated Jan. 31, 2013 from the Intellectual Property Office of New Zealand re Application No. 591266.

Search and Examination Report dated Dec. 21, 2012 from the Intellectual Property Office of Singapore re: 201100416-5.

PCT Search Report and Written Opinion dated Jan. 31, 2013; PCT/US2012/044436.

Final Office Action in U.S. Appl. No. 13/173,911 dated Mar. 31, 2015. 16 pages.

International Search Report dated Apr. 20, 2010, PCT Appln. No. PCT/IB2009/053169 filed Jul. 22, 2009. 7 pages.

International Preliminary Report on Patentability (Written Opinion) dated Jan. 25, 2011 PCT Appln. No. PCT/IB2009/053169 filed Jul. 22, 2009, 8 pages.

Communication Pursuant to Article 94(3) EPC dated Apr. 5, 2013 From the European Patent Office Re. Application No. 09786662.8.

Communication Pursuant to Rules 161(1) and 162 EPC dated May 17, 2011 From the European Patent Office Re. Application No. 09786662.8.

International Preliminary Report on Patentability dated Feb. 3, 2011 From the International Bureau of WIPO Re. Application No. PCT/IB/2009/053169.

* cited by examiner

RAZOR CARTRIDGE WITH REDUCED PART COUNT AND EXPANDED RANGE OF MOTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application is a continuation of U.S. application Ser. No. 13/173,911 filed Jun. 30, 2011, now U.S. Pat. No. 9,144,914 B2 entitled "RAZOR CARTRIDGE WITH REDUCED PART COUNT AND EXPANDED RANGE OF MOTIONS."

BACKGROUND

Field

A personal care item, more particularly a shaving device.

Background

A diversity of shaving means are available on the market, for example manually operated, electric shavers, multiple use and disposable shaving devices. Typically, such shaving devices include a gripping handle for conveniently holding one or more cutting blades and a respective cartridge bearing one or more or those blades, secured within. Many of these devices include numerous blades and a host of small part such the manufacture is complex and expensive. Moreover, the resulting products are often bulky making it difficult to shave in corners such as around the nose. Additionally, users often find it difficult to maintain contact between the cutting blades and the skin and the razor traverses the myriad angles of the face.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration.

Figure 1B:
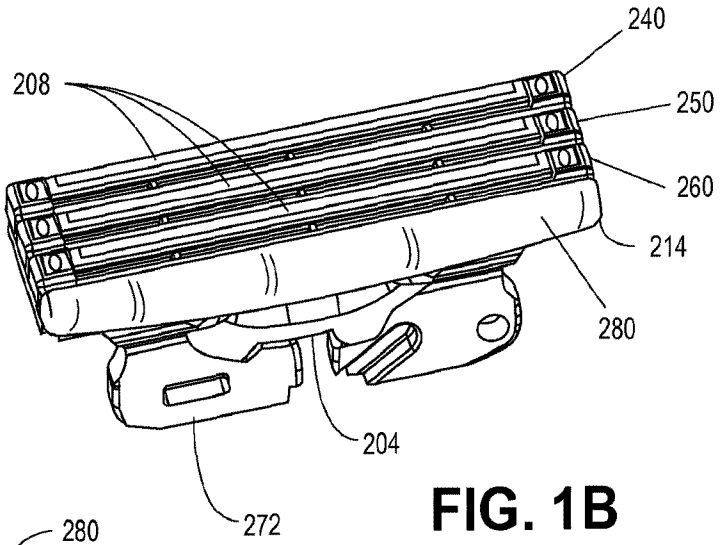
FIGS. 1A and 1B are schematic diagrams of a rear perspective view and a front perspective view, respectively, of a shaving assembly of an embodiment of the invention.
Figure 1A:
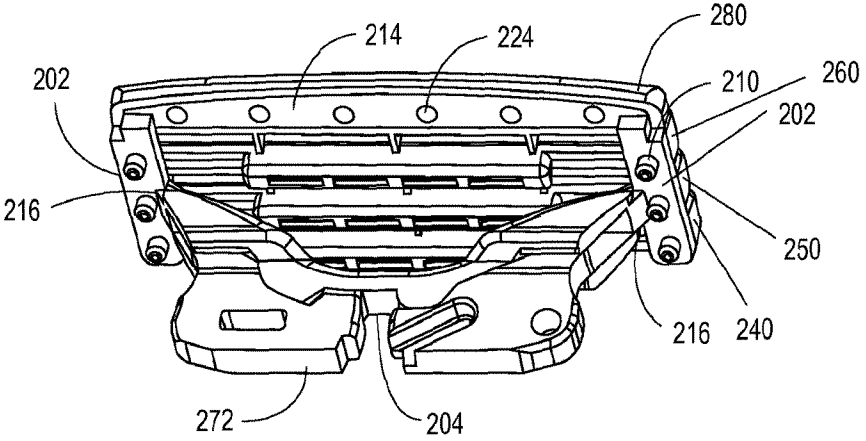

FIGS. 1A and 1B are schematic diagrams of a rear perspective view and a front perspective view respectively of a shaving assembly of one embodiment of the invention. A plurality of independent cartridges 240, 250 and 260 are coupled to a pair of cross pieces 202 of a cartridge support. Cartridge support also includes a bridge 204 spanning between cross pieces 202. Bridge 204 is coupled to each cross piece 202 at an attachment point 216.

In the shown embodiment, three independent cartridges, leading cartridge 260, middle cartridge 250 and following cartridge 240 are used. In one embodiment, each cartridge is independently attached to a cross piece 202 with middle cartridge 250 being attached substantially at the attachment point 216 and leading and following cartridges 260 and 240 being attached on either side adjacent thereto. The composition of each cartridge is described more fully with reference to FIG. 2 below. Generally, cross pieces 202 are flexible and can flex between a concave and a convex orientation. This is discussed more fully below with reference to FIGS. 3A and 3B. At rest, e.g., when no force is applied, cross pieces 202 are substantially planar. Cartridges 240, 250 and 260 may be attached to cross pieces 202 using adhesive, rivets, heat welding or any conventional attachment mechanism or a combination thereof. The positioning of the cartridges along cross piece 202 and in particular the finite space "d" between each cartridge pair (better shown in FIGS. 3A and 3B) dictates the amount of concavity that a face of the razor can achieve before contact between the adjacent cartridges prevents further movement. Because each of the cartridges 240, 250 and 260 is independent, the relative movement of one cartridge, as the razor face becomes convexed, is not affected by the other cartridges. Such movement is only constrained by the flexibility and resilience of the cross piece 202.

As used herein, "leading" refers to earlier in position relative to the direction of shaving. Thus, leading cartridge 260 encounters an area to be shaved before middle cartridge 250 as the assembly is pulled along the shaving area. In one embodiment, the shaving assembly includes a leading platform 214 on which may be disposed a lubricating strip 280. Leading platform 214 may be attached to or formed with cross pieces 202. Lubricating strip 280 is positioned to release lubrication in advance of leading cartridge 260.

In some embodiments, each cartridge may also have its own lubricating strip 208, which lubricates the area to be shaved before the next successive cartridge arrives. Leading platform 214 may include perforations 224 to improve the adhesion of the lubricating strip 208. In an alternative embodiment, lubricating strip 208 may be replaced with flexible ribs or mirror fans that raise the drain in advance of leading cartridge 260. A handle interconnect 272 is coupled to the bridge 204 to allow the shaving assembly to be coupled to a razor blade handle. Handle interconnect 272 may provide for reciprocation of the entire assembly when attached to a handle. Razor interconnect 272 may have any necessary configuration to allow it to connect to the myriad possible razor handles commercially available or subsequently designed.

Figure 2:
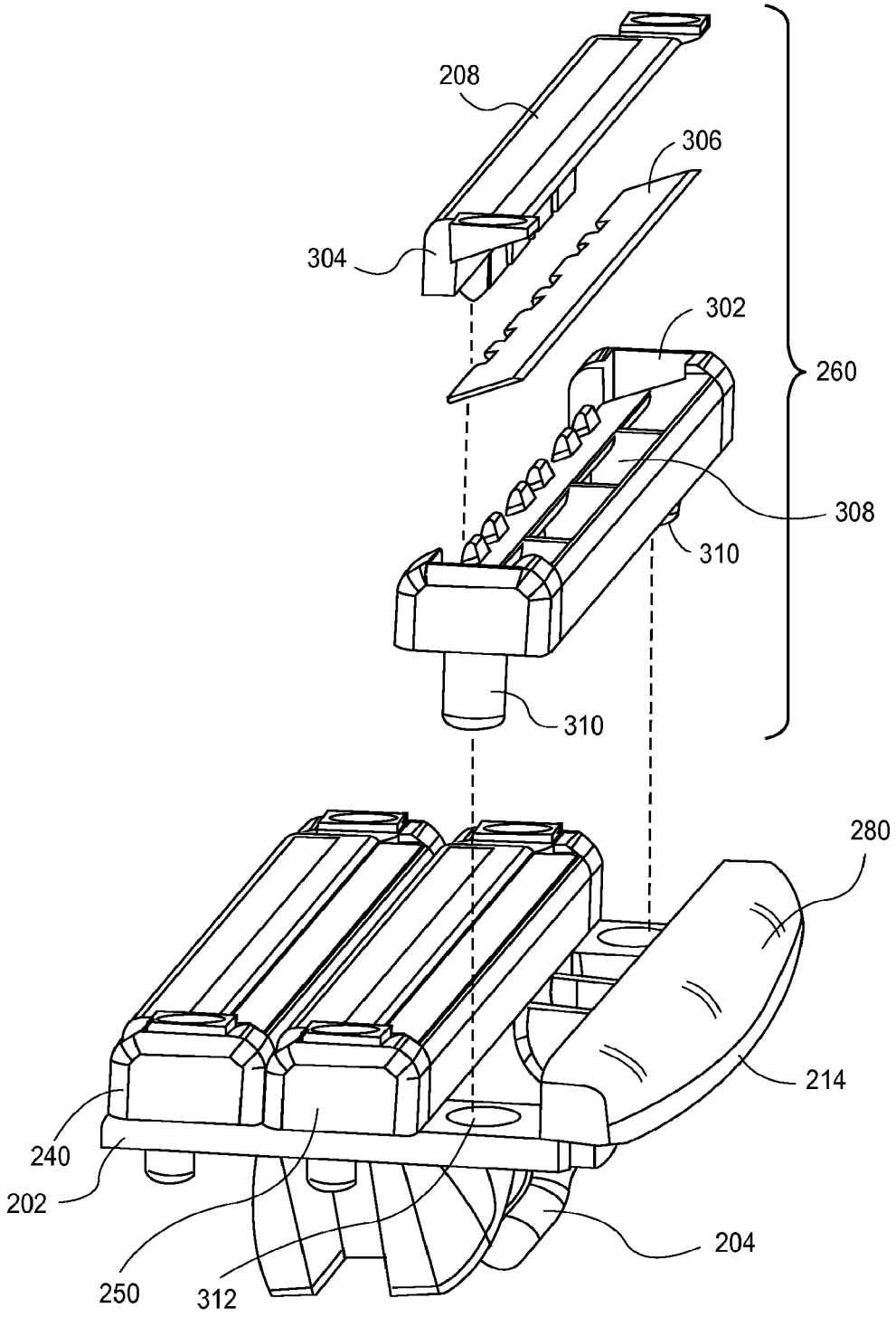
FIG. 2 is an exploded view of a razor assembly in an embodiment of the invention.

FIG. 2 is an exploded view of the shaving assembly in one embodiment of the invention. Leading cartridge 260 is shown exploded. Each cartridge includes a blade 306 and a carrier having a base 302 and a cap 304, which together retain the blade 306. The base 302 and cap 304 may be injection molded out of any suitable plastic or other material, for example, extruded from plastic or aluminum. In one embodiment, base 302 is integrally formed with mounting pegs 310 extending therefrom. Mounting pegs 310 engage holes 312 in cross piece 202 and may be heat welded or otherwise adhered therein. Cap 304 is designed to snap fit into base 302 to retain blade 306. Base 302 defines channels 308 through which shaved hair may pass without clogging or blocking blade 306.

In various embodiments, cross piece 202 may be formed from commercially available elastomeric nylon 12, polyurethane, or any other suitably resilient synthetic material. Generally, it is desirable for cross piece 202 to have sufficient resilience to deform and return to its generally planar original state for at least 8000 cycles. Resilience of 10,000 cycles or more is preferred. In some embodiments, cross piece 202 and bridge 204 are molded or extruded integrally as a unit. In some other embodiments, cross piece 202 and base 302 are molded integrally as a unit. It should be noted that when the bases 302 of each cartridge can be formed integrally as one piece with each other and that in such case there is no need for a bridge 204.

Figure 3A:
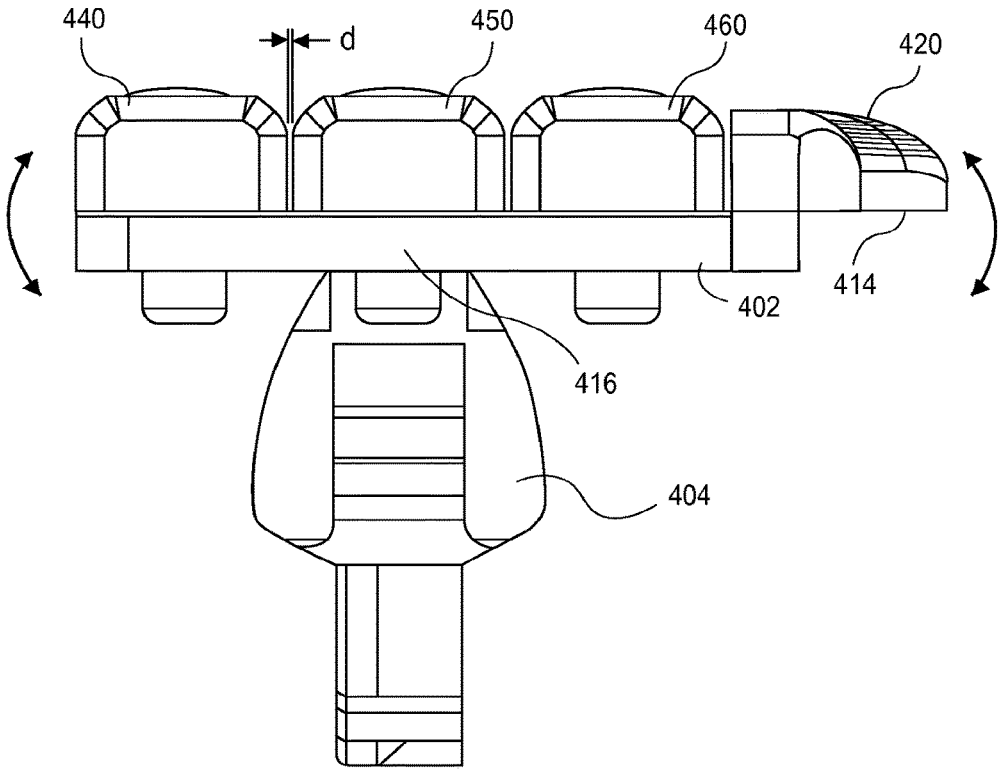
FIGS. 3A and 3B are schematic side views of a shaving assembly of an embodiment of the invention in a non-flexed and convex orientation, respectively.
Figure 3B:
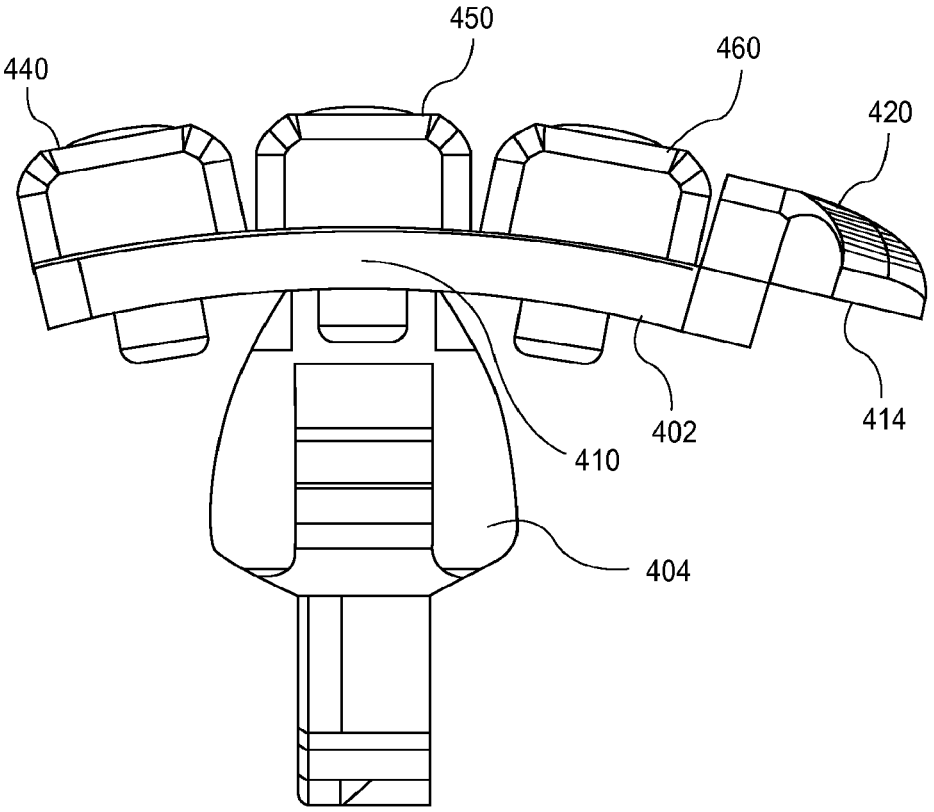

FIGS. 3A and 3B are schematic side views of a shaving assembly an embodiment of the invention, in an unflexed and a convexed orientation, respectively. A cross member 402 is coupled to a bridge 404 and retains independent cartridges 440, 450 and 460. The bidirectional arrows in the figure are indicative of the ability of the cross members 402 to flex around attachment point 416 into either a concave or a convex orientation. Finite space "d" exists between adjacent cartridge pairs 440, 450 and 460. The finite space "d" dictates the amount by which cross member 402 can flex to concave the face of the shaving assembly. As cross member 402 flexes into a concave orientation adjacent cartridges come into contact and prevent further concavity. In the absence of a finite space "d", cross member 402 (once assembled) will only be able to flex in a direction to cause the face to become convexed. The convex orientation assists in shaving a tight area, such as under a user's nose while the concave orientation assists in shaving around angular portions, such as the chin. Generally speaking, the need for convex flexibility exceeds that for concave flexibility. In the shown embodiment, leading platform 414 supports a series of micro ribs, which may be formed of an elastomeric material and are designed to lift the hair in advance of the blade from leading cartridge 460. It should be understood that the micro ribs could be replaced in whole or in part by a lubricating strip on the leading platform 414.

FIG. 3B shows cross member 402 flexed in a convexed, orientation leading about attachment point 416. As previously noted, this orientation makes it easier to get into tight spaces, such as around a user's nose. Notably, leading platform 414 provides leverage to facilitate this flexion as a user presses the assembly against the area to be shaved wherein the leading platform 414 provides a lever arm to initiate bending about attachment point 416.

Figure 4A:
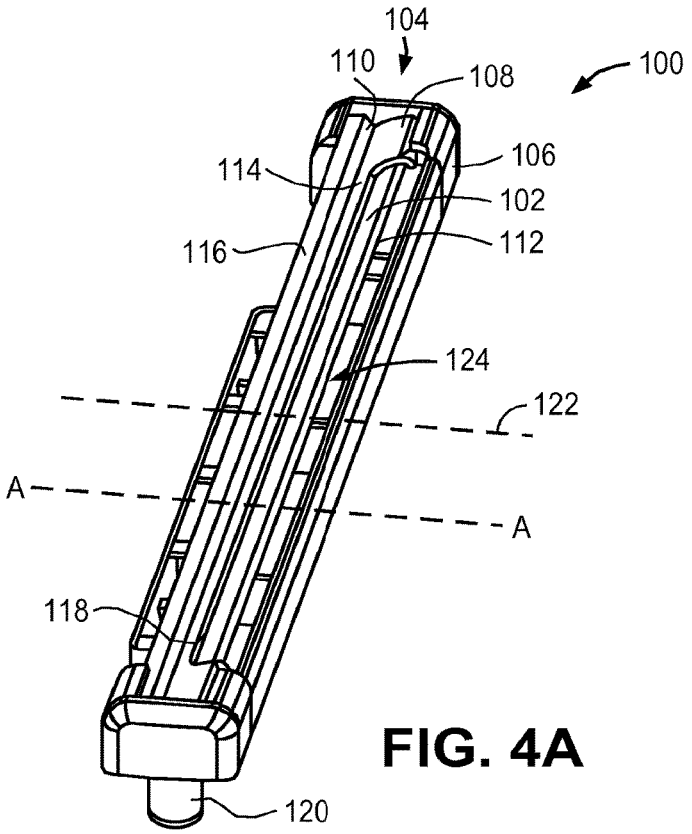
FIG. 4A illustrates a perspective view of an embodiment of a shaving cartridge.

FIG. 4A illustrates a perspective view of an embodiment of a shaving cartridge. Shaving cartridge 100 may include blade 102, cover 104 and base member 106. In some embodiments, blade 102 may be a razor blade. Cover 104 may be secured to blade 102. Cover 104 may further be attached to base member 106 and retain blade 102 in place within cartridge 100. Cover 104 is positioned over blade 102 such that during shaving, cover 104 and cutting edge 112 of blade 102 contact the user's skin. In this aspect, cover 104 defines a recessed portion 118 along cutting edge 112 so that a portion of cutting edge 112 is exposed to the user's skin. Cover 104 may serve as a protective cover over blade 102.

Cover 104 defines a channel 114 adjacent to blade 102. In one embodiment, the channel is generally V-shaped. The channel may be defined by a first panel 108 and a second panel 110. In addition to serving as a protective cover, cover 104 may be dimensioned to spread the pressure of cutting edge 112 across the skin better than conventional razor blade cartridges and improve cutting edge 112 glide across the skin so as to reduce nicks and cuts. These advantages are achieved, at least in part, by decreasing the surface area of cover 104 and cutting edge 112 contacting the user's skin by approximately 60% as compared to the conventional razor blade cartridges. Stated slightly differently, if one were to draw a bounding box around the cartridge in the shaving plane, the area above the channel represents 60% of the area within the bounding box.

Cover 104 with blade 102 attached thereto is positioned on base member 106 such that during a shaving operation, upper edge 116 of second panel 110 and cutting edge 112 define cutting plane 122. Portions of cover 104 within channel region 114 remain raised above cutting plane 122 during shaving and therefore do not contact the user's skin. Additionally, upper edge 116 stretches the skin to increase the closeness of the shave.

Cover 104 may be made of any material suitable for contacting a user's skin during shaving. Representatively, cover 104 may be made of a metal material, for example, aluminum. In still further embodiments, cover 104 may be made of other materials such as a plastic material. In some embodiments, cover 104 may be stamped from an aluminum sheet as a single unit. In other embodiments, cover 104 may be formed by any process known in the art such as injection molding, machining or any other manufacturing process suitable for generating the desired features of cover 104.

In embodiments where cover 104 is made of a metal material, a lubricating coating may be applied to cover 104 to facilitate movement of cartridge 100 across the user's skin. Representatively, an electrostatic spray coating method may be used to apply solids such as telomers as dispersions in water, alcohols, freons, or various fluorocarbon liquids, for example, an aqueous dispersion of tetrofluoroethylene telomer along upper edge 116 of cover 104. Alternatively, a lubricating strip infused with a lubricating material, for example, aloe vera and/or coconut milk, may be attached to cover 104. Any of the above discussed lubricating coatings and/or materials may further be disposed on portions of base member 106 contacting the user's skin.

Attachment of cover 104 and blade 102 to base member 106 may be achieved by welding cover 104 directly to blade 102. Representatively, cover 104 may be spot welded to blade 102 at various points along a length dimension of blade 102. Cover 104 may then be attached to base member 106 as will be discussed in more detail in reference to FIG. 7. The use of cover 104 to attach blade 102 to base member 106 as disclosed herein, as opposed to attaching blade 102 directly on base member 106, results in a more rigid cartridge 100 that maintains blade 102 shape. It is believed that this results in a longer lasting blade having better gliding capabilities.

Base member 106 may include mounting peg 120 to facilitate attachment of base member 106 to a bridge as will be discussed in further detail in reference to FIG. 7. In one embodiment, base member 106 is integrally formed with mounting peg 120 extending therefrom. Base member 106 may further include elongated aperture 124 through which shaved hair may pass without clogging or blocking blade 102.

Figure 4B:
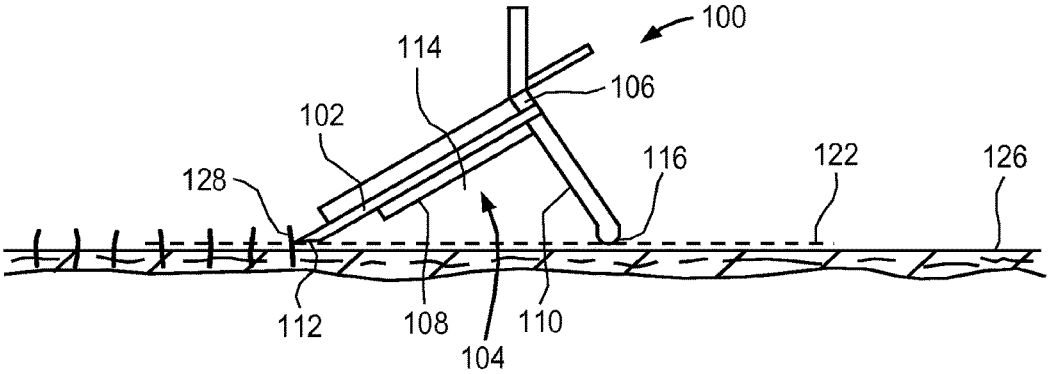
FIG. 4B illustrates a cross sectional view of the shaving cartridge of FIG. 4A along line A, A'.

FIG. 4B illustrates a cross sectional view of the shaving cartridge of FIG. 4A along line A, A'. FIG. 4B shows shaving cartridge 100 of FIG. 4A rotated so that cutting edge 112 is positioned along skin 126 to shave hairs 128 extending therefrom. From this view, it can be seen that cutting plane 122 is defined by upper edge 116 of second panel 110 and cutting edge 112. During shaving of hairs 128 extending from skin 126, channel 114 of cover 104 is raised above skin 126 such that only upper edge 116 of cover 104 and cutting edge 112 slide along the skin. In some embodiments, channel 114 may help to retain lubricating and/or moisturizing fluids used during shaving, such as soaps, foams, water, etc., against skin 126. Such feature may further improve the glide of cartridge 100 against skin 126 and the condition of skin 126 in general after shaving.

Figure 5:
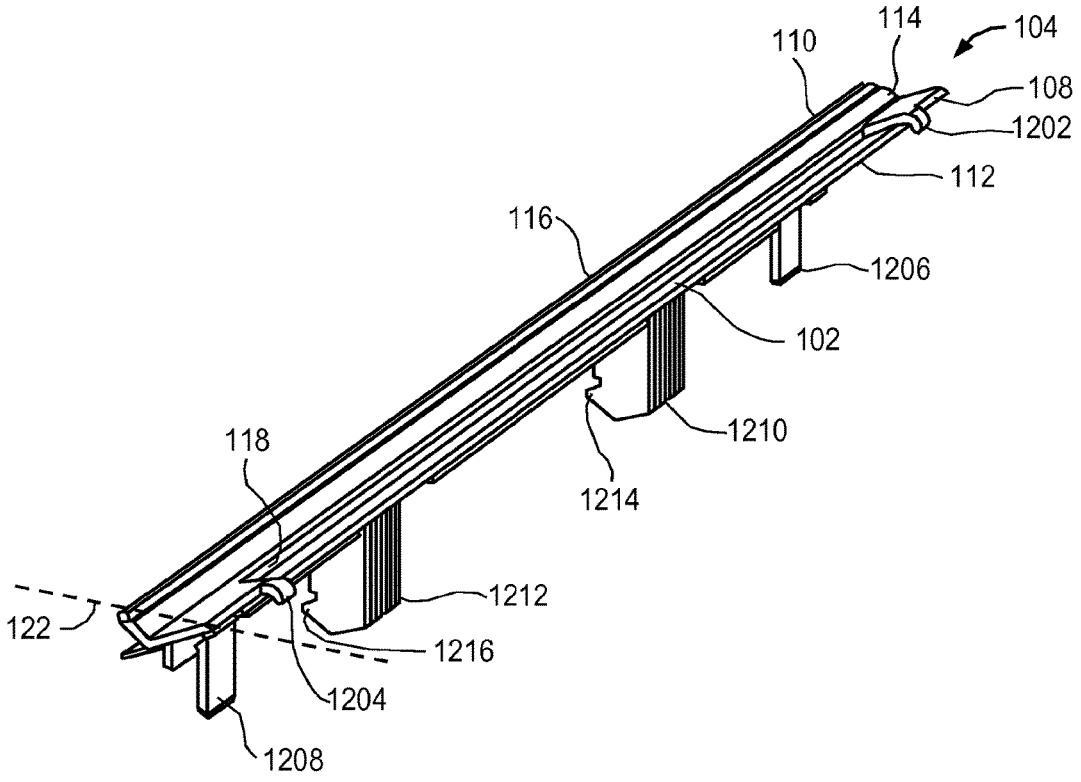
FIG. 5 illustrates a perspective view of the cover and blade illustrated in FIG. 4A.

FIG. 5 illustrates a perspective view of the cover and blade illustrated in FIG. 4A. As previously discussed, cover 104 may include first panel 108 and second panel 110. Recess 118 may be formed within first panel 108 to expose a portion of cutting edge 112 of blade 102 attached thereto. From this view, a depth of channel region 114 with respect to cutting plane 122 formed by edge 116 and cutting edge 112 can be more clearly seen. In particular, it can be seen that only edge 116 of second panel 110 and cutting edge 112 are within cutting plane 122. As a result, during shaving, only edge 116 and cutting edge 112 contact the user's skin, while channel region 114 of cover 104 remains raised above the surface of the skin.

Cover 104 may further include stop members 1202 and 1204 extending from first panel 108. Stop members 1202 and 1204 are dimensioned to extend around cutting edge 112. In this aspect, stop members 1202 and 1204 help to properly position blade 102 and, in particular, cutting edge 112, within cover 104. Stop members 1202 and 1204 may be integrally formed with cover 104.

In addition, cover 104 may include tabs 1206, 1208, 1210 and 1212 for securing cover 104 to base member 106. Tabs 1206, 1208, 1210 and 1212 may extend below cover 104 so that they can be secured to underlying base member 106. Although FIG. 5 shows tabs 1206 and 1208 as substantially straight, planar structures, to secure tabs 1206 and 1208 to base member 106, tabs 1206 and 1208 may be bent as will be discussed in more detail in reference to FIG. 6 and FIG. 7. Tabs 1210 and 1212 may be positioned between tabs 1206 and 1208. Tabs 1210 and 1212 may be substantially straight structures which include barbed portions 1214 and 1216, respectively, at the ends. When cover 104 is positioned within base member 106, barbed portions 1214, 1216 catch on portions of base member 106 to secure cover 104 to base member 106.

Figure 6:
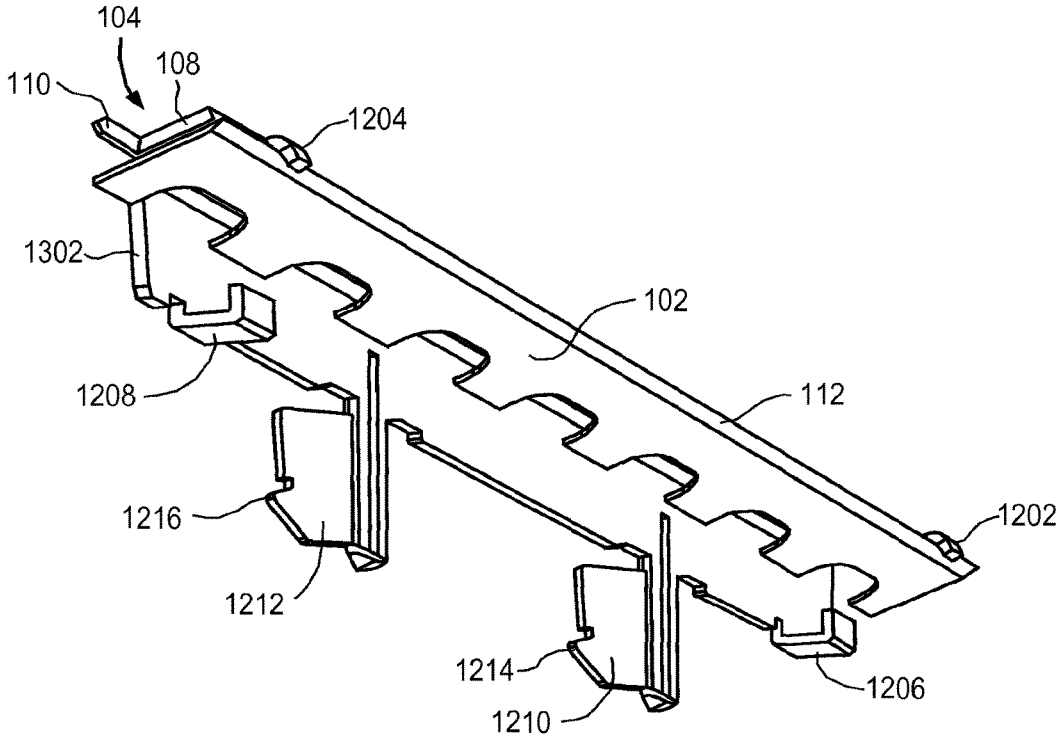
FIG. 6 illustrates a bottom perspective view of the cover and blade illustrated in FIG. 5.

FIG. 6 illustrates a bottom perspective view of the cover and blade illustrated in FIG. 5. From this view, it can be seen that cover 104 further includes back plate 1302 extending from second panel 110. Back plate 1302 extends below blade 102 and along a back side of base member 106 (see FIG. 7). In this aspect, back plate 1302 helps to align blade 102 and cover 104 with base member 106. Tabs 1206, 1208, 1210 and 1212 may be integrally formed with back plate 1302. In FIG. 6, tabs 1208 and 1206 are shown in a bent configuration used to secure cover 104 to base member 106.

Figure 7:
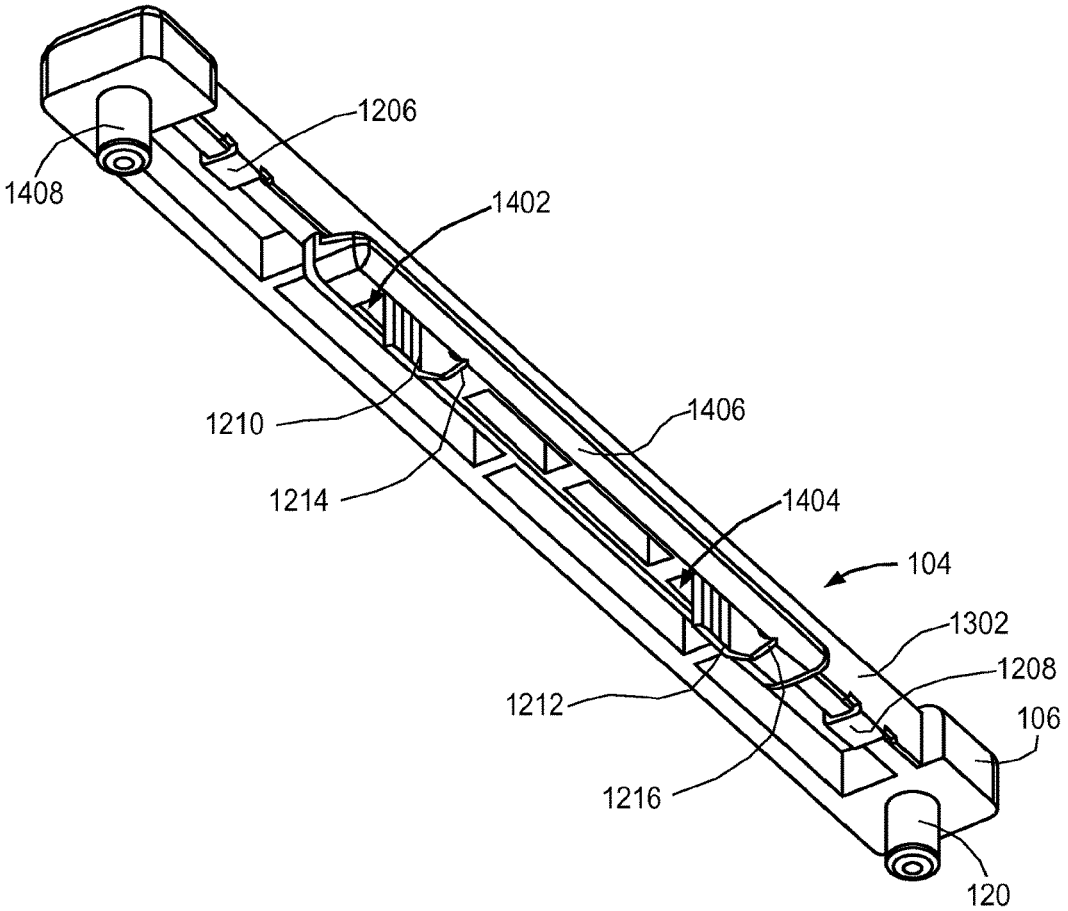
FIG. 7 illustrates a rear perspective view of the shaving cartridge illustrated in FIG. 4A.

FIG. 7 illustrates a rear perspective view of the shaving cartridge illustrated in FIG. 4A. From this view, the manner in which cover 104 is attached to base member 106 can be seen. In particular, to attach cover 104 to base member 106, back plate 1302 of cover 104 is positioned along a back side of base member 106. Tabs 1206 and 1208 are then bent around an underside of base member 106. Tabs 1210 and 1212 are inserted through slots 1402 and 1404, respectively, formed by bracket 1406 along an underside of base member 106. Barbs 1214 and 1216 of tabs 1210 and 1212, respectively, catch on edges of slots 1402 and 1404 to hold tabs 1210 and 1212 in place.

Base member 106 may include pegs 120 and 1408. Pegs 120 and 1408 may be used to secure base member 106 to a bridge as will be discussed in more detail in reference to FIG. 8.

Figure 8:
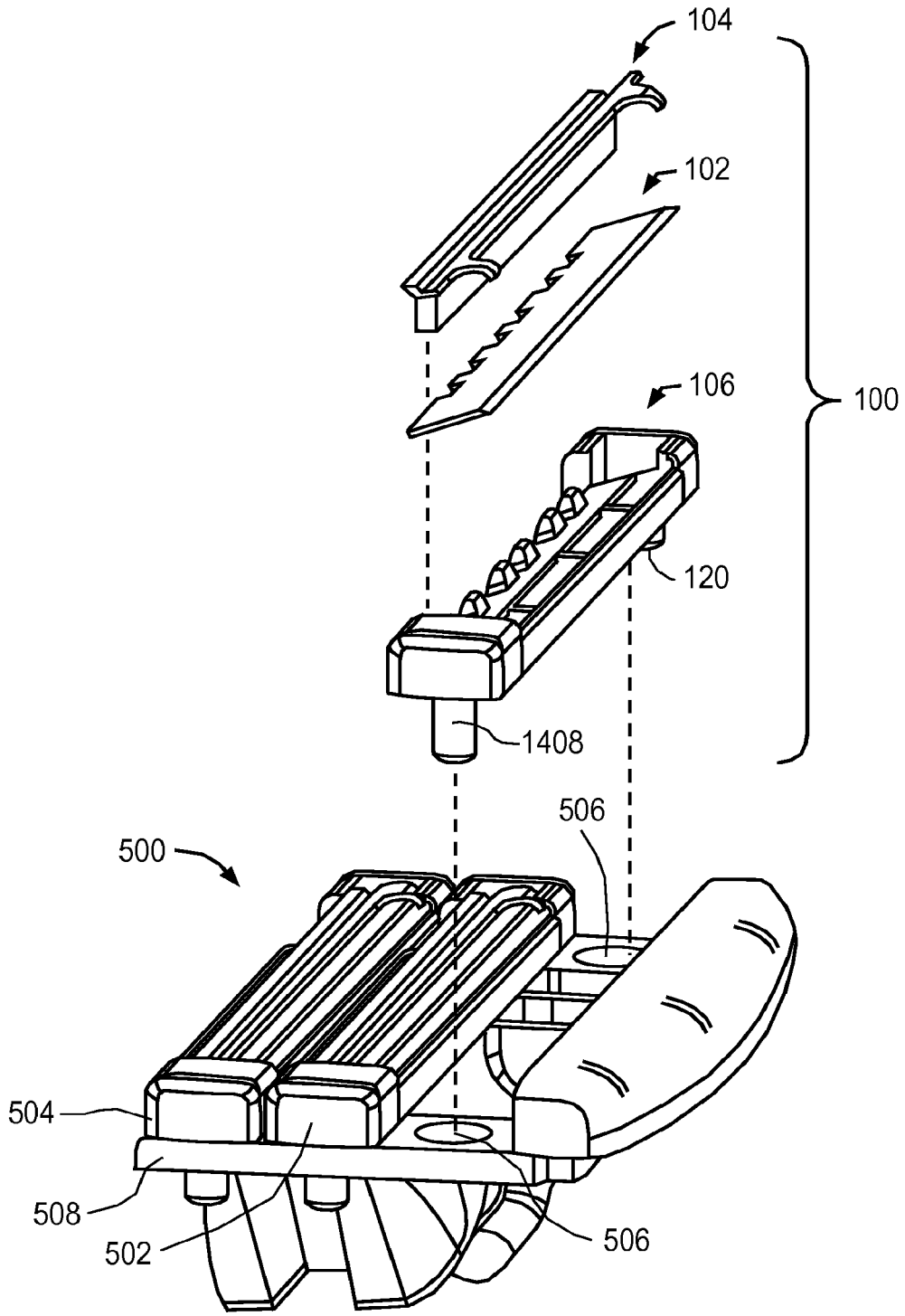
FIG. 8 illustrates an exploded view of one embodiment of a shaving assembly.

FIG. 8 illustrates an exploded view of one embodiment of a shaving assembly. Shaving assembly 500 may include a plurality of cartridges 100, 502 and 504. Cartridge 100 may be substantially the same as cartridge 100 described in reference to FIG. 4A. Cartridges 502 and 504 may be substantially the same as cartridge 100. In FIG. 8, cartridge 100 is shown exploded.

Each cartridge includes cover 104 and base member 106, which together retain blade 102 within cartridge 100. In one embodiment, base member 106 is integrally formed with mounting pegs 120 and 408 extending therefrom. Mounting pegs 120 and 408 engage holes 506 in bridge 508 and may be heat welded or otherwise adhered therein. In various embodiments, bridge 508 may be formed from commercially available elastomeric nylon 12, polyurethane, or any other suitably resilient synthetic material. It should be noted that base member 106 of each cartridge can be formed integrally as one piece with each other. Bridge 508 may in turn be attached to a handle interconnect member to attach cartridges 100, 502 and 504 to the razor handle as will be discussed in more detail in reference to FIGS. 9A and 9B.

Figure 9A:
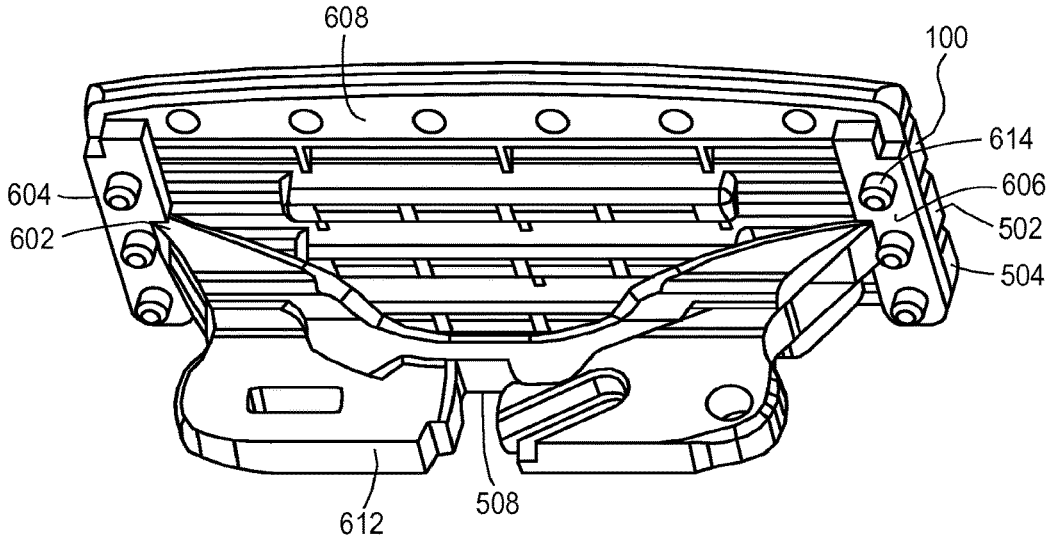
FIG. 9A illustrates a rear perspective view of the shaving assembly of FIG. 8.
Figure 9B:
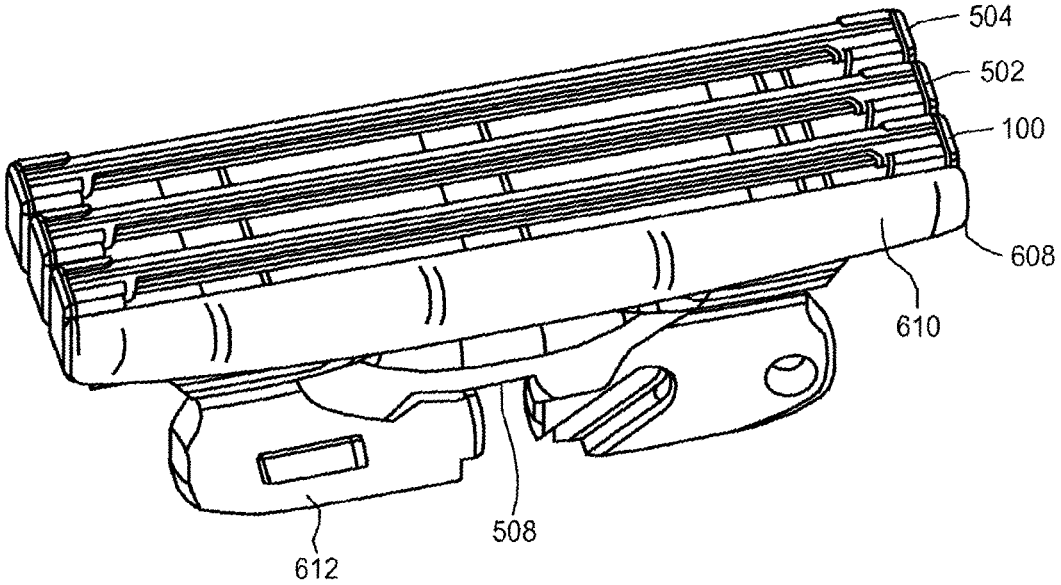
FIG. 9B illustrates a front perspective view of the shaving assembly of FIG. 8.

FIGS. 9A and 9B illustrate a rear perspective view and a front perspective view, respectively, of the shaving assembly of FIG. 8. A plurality of independent cartridges 100, 502 and 504 such as those previously discussed in reference to FIG. 8 are coupled to bridge 508.

In the illustrated embodiment, three independent cartridges, leading cartridge 100, middle cartridge 502 and following cartridge 504 are used. In one embodiment, each cartridge is independently attached to bridge 508. Middle cartridge 502 may be attached substantially at the attachment point 602 and leading and following cartridges 100 and 504 may be attached on either side adjacent thereto.

In some embodiments, bridge 508 may be flexible and can flex between a concave and a convex orientation. In this aspect, cross pieces 604 and 606 of bridge 508 may be formed from commercially available elastomeric nylon 12, polyurethane, or any other suitably resilient synthetic material. At rest, e.g., when no forced is applied, cross pieces 604 and 606 of mounting assembly 508 are substantially planar. Cartridges 100, 502 and 504 may be attached to cross pieces 604 and 606 using, for example, rivets 614. In still further embodiments, cartridges 100, 502 and 504 may be attached to cross pieces 604 and 606 using any other conventional attachment mechanism such as an adhesive, heat welding or a combination thereof. Because each of the cartridges 100, 502 and 504 is independent, the relative movement of one cartridge as the razor face becomes convexed is not affected by the other cartridges. Such movement is only constrained by the flexibility and resilience of cross pieces 604 and 606. In such an embodiment, the blades of the collection of cartridges define a plane when the razor in its rest state, e.g. no force is being exerted on the shaving head. In an alternative embodiment, cross pieces 604 and 606 may not be flexible such that the all cartridges are retained in a substantially rigid shaving plane.

As noted above the leading cartridge 100 encounters an area to be shaved before middle cartridge 502 as the assembly is pulled along the shaving area. In one embodiment, the shaving assembly may include leading platform 608. Leading platform 608 may be attached to, or formed with, cross pieces 604 and 606. Lubricating strip 610 is positioned to release lubrication in advance of leading cartridge 100.

In some embodiments, lubricating strip 610 (see FIG. 9B) may be applied to leading platform 608. In addition or in the alternative, each cartridge 100, 502 and 504 may also have its own lubricant as previously discussed to lubricate the area to be shaved before the next successive cartridge arrives. In an alternative embodiment, lubricating strip 610 may be replaced with flexible ribs that raise the hair in advance of leading cartridge 100.

Handle interconnect 612 may be coupled to mounting assembly 508 to allow the shaving assembly to be coupled to a razor handle. Razor interconnect 612 may have any necessary configuration to allow it to connect to the variety of possible razor handles commercially available or subsequently designed.

Figure 10:
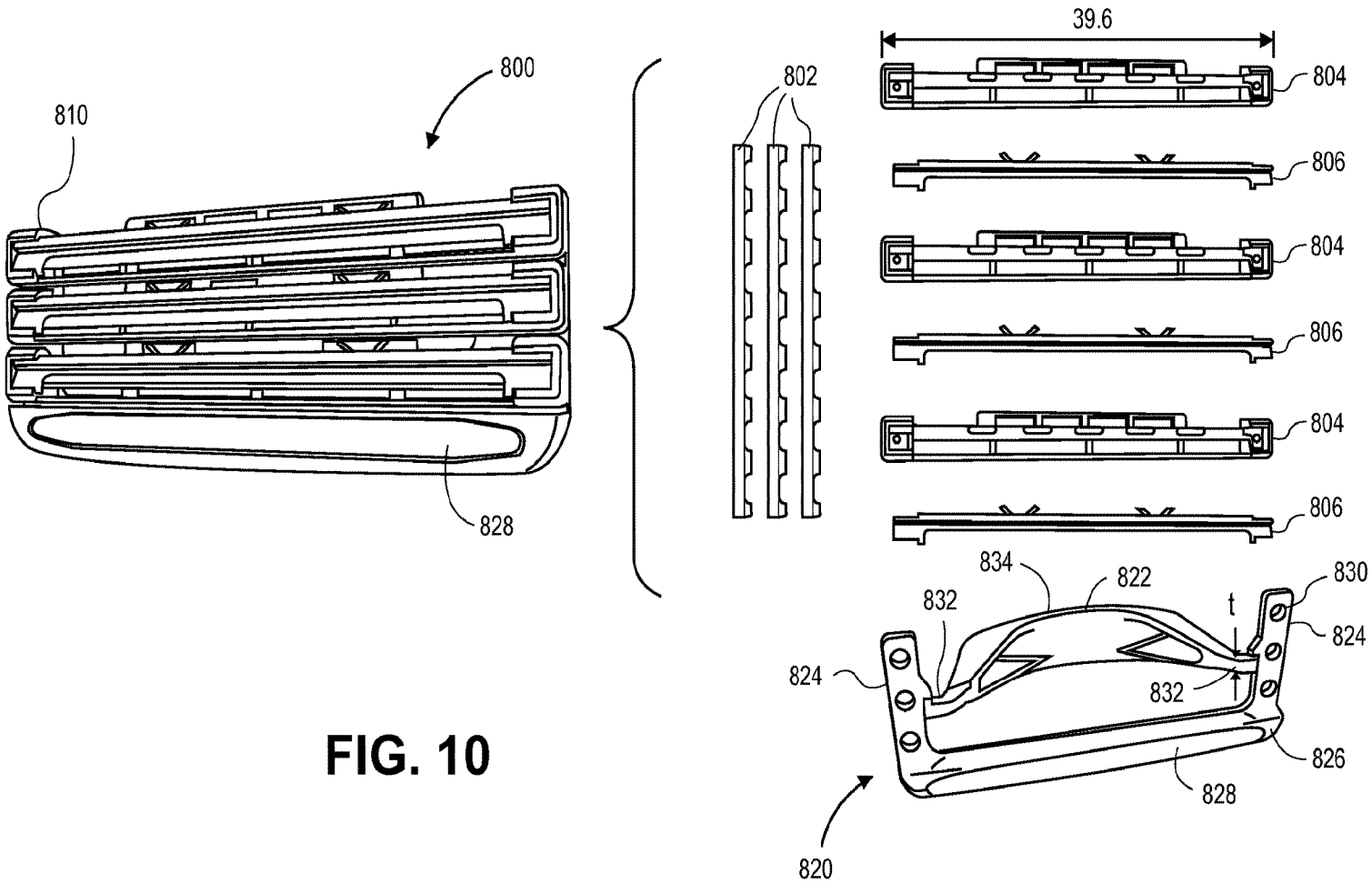
FIG. 10 is a plan and exploded view of a razor head of one embodiment of the invention.

FIG. 10 shows a plan and exploded view of a razor head of one embodiment of the invention. Razor head 800 has a plurality of razor cartridges 810 forming a part thereof. Razor cartridges 810 comprise a blade 802, a base 804, and a cover 806 and may be manufactured as described in connection with FIGS. 4A-9 above. In the shown embodiment, three cartridges 810 are coupled to a yoke 820. Yoke 820 is molded as a single unitary piece of material. In one embodiment, the yoke is molded from thermoplastic. In one embodiment, the selected material is EMS Grillflex ELG 5660 manufactured by EMS-GRIVORY. However, other thermoplastics may be used.

Yoke 820 includes a bridge 822 integrally formed with a pair of cross pieces 824, which define attachment points 830 to receive cartridges 810. Bridge 822 couples to cross pieces 824 by a pair of living hinges 832. Living hinges have a thickness t, which permits the blade assembly to pivot about a living hinge in forward and backward directions through a first and second arc. In one embodiment t is equal to 1 mm±0.1 Other embodiments may have a greater or lesser t. The arc of pivot is limited by thickness t and the rigidity of the material forming the living hinges 832. By selecting an appropriate material for molding premature fatigue at the living hinges is avoided. In one embodiment, attachments points 830 are a series of bores defined through cross pieces 824. Cross pieces may have the same flexibility characteristics as described with other embodiments above. This permits attachment pegs 838 of base 804 (shown in FIG. 11) to be heat welded within the bore 830. In one embodiment, each cartridge 810 has a length dimension of 39.6 millimeters which spans between the cross pieces 824. Other dimensions are contemplated as within the scope of other embodiments of the invention.

In some embodiments, yoke 820 includes a leading platform 826, which may define a well 828 to receive a lubricating material. In this manner, lubricating material is applied to skin in advance of a leading blade of a leading cartridge within the assembly. Also molded as part of yoke 820 in one embodiment of the invention is a handle attachment piece 834, which permits a handle, such as a conventional stick handle or any other suitable handle to be attached to the blade assembly. Notably, while in some embodiments cartridges 810 are as described in connection with FIGS. 4A-9, in other embodiments, cartridges as described relative to FIGS. 1A-3B may be attached to the unitary yoke 820. In another embodiment, the bases 804 of the cartridges 810 are molded integrally with the yoke 820.

From a manufacturing standpoint, the embodiment described as reference to FIG. 10 includes exactly four unique parts (three of those parts are replicated three times for a total part count for a three cartridge blade assembly of ten). This part count is less than half a part count associated with the products of current market leaders Gillette and Schick. By way of example, the Schick Hydro includes twenty-five distinct parts and the Gillette Fusion includes twenty-four distinct parts. In embodiments in which the bases 804 are molded integrally with the yolk 820, the part count is reduced by the number of bases. Additionally, the manufacturing step of base attachment is avoided.

Figure 11:
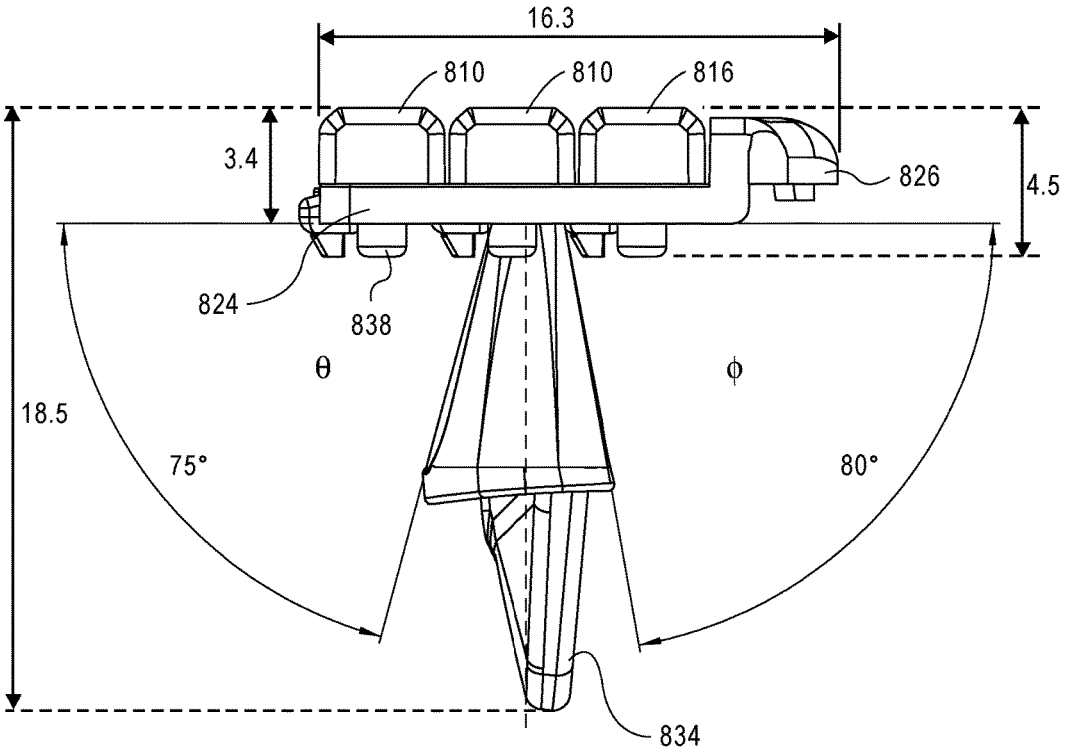
FIG. 11 is a side view of shaving head of one embodiment of the invention.

FIG. 11 is a side view of shaving head of one embodiment of the invention. Certain dimensions of one embodiment in millimeters are shown. In one embodiment, living hinges 832 allow cross pieces 824 and cartridges coupled thereto to pivot forward through an arc $\phi$, which in one embodiment is 80 degrees. For purposes of comparison The Gillette Fusion has a maximum pivot arc of 55 degrees in a single direction. The same living hinges permit cartridges 810 and cross piece 824 to pivot backwards in arc $\theta$ of, for example, 75 degrees. In other embodiments, $\phi$ may be 60 degrees or 50 degrees and $\theta$ may be selected to be, for example, 50 or 40 degrees. The forward and backward arcs are defined from a rest position, the rest position being the position of the head when no force is applied. However, a greater arc of pivot increases the range of angles of the handle over which the blades 802 will remain on a user's skin in an effective position. In one embodiment, cross pieces 824 are also flexible, such that the overall face of the razor may flex to be concave or convex as described above in connection with FIGS. 3A-3B. In an alternative embodiment, cross pieces 824 may not be flexible such that while the head can pivot about the living hinges the all cartridges are retained in a shaving plane.

Figure 12A:
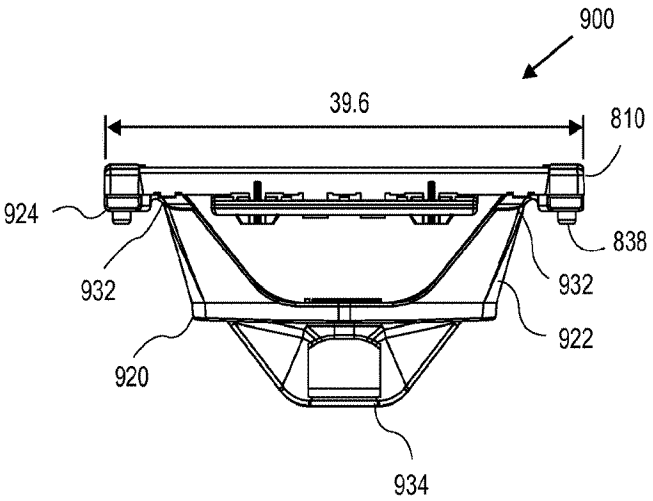
FIGS. 12A-12C illustrate an alternative embodiment of the invention having a single cartridge associated with a unitary yoke.
Figure 12B:
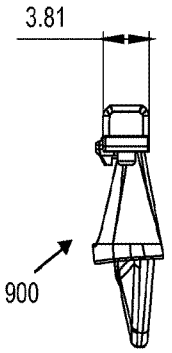
Figure 12C:
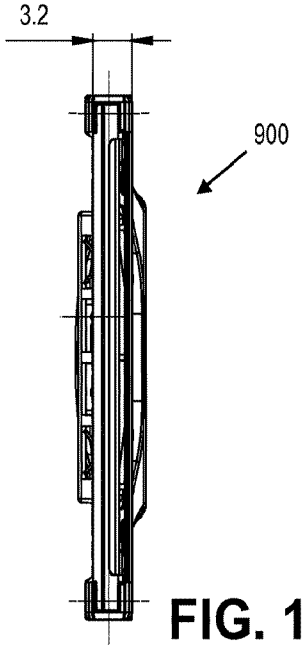

FIGS. 12A-12C are depictions of an alternative embodiment of the invention having a single cartridge associated with a unitary yoke. A shaving head 900 includes a yoke 920 having a bridge 922 that couples to cross pieces 924. Cross pieces 924 define an attachment point for a single cartridge 810. For example, cross pieces 924 may define a bore to receive integrally molded attachment peg 838 and coupling may be by heat welding, adhesion or any other suitable manner. Yoke 920 may include a handle attachment piece 934 to allow the assembly to be coupled to a shaving razor handle. In the shown embodiment, the long dimension of the cartridge is 39.6 millimeters. However, reduced sized cartridges, being for example, 19.8 millimeters are within the scope and contemplation of the invention. Other sizes are also within the scope and contemplation of the invention.

FIG. 12B shows a side view of a single cartridge embodiment of the invention. This view reveals the cross dimension of one embodiment of the cartridge is 3.81 millimeters. FIG. 12C shows a top plan view of a single cartridge embodiment. In this view, the dimension of the cover blade assembly can be seen to be 3.2 millimeters. These small dimensions permit the razor to function effectively in tight spaces such as around the nose.

While explicit dimensions are shown and described in connection with various embodiments, it is within the scope and contemplation to change those dimensions. Thus, the actual dimensions may be larger or smaller than the dimensions detailed. However, it has been found that the dimensions shown yield a quality product providing an exceptional shave.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A shaving razor comprising:

a yoke molded as a single piece, the yoke including a bridge and a pair of cross pieces coupled to the bridge each by a living hinge, the cross pieces are coupled to define an angle with the bridge, the living hinge defining a vertex of the angle;

a cartridge having a razor blade coupled to the yoke to span between the cross pieces wherein a longitudinal axis of the blade is substantially perpendicular to the cross pieces; and at least a second cartridge having at least one blade and coupled to the yoke to span between the cross pieces the cartridges collectively forming a blade assembly wherein at least one of the cartridges is disposed on the cross pieces ahead of the living hinges and at least another one of the cartridges is disposed on the cross pieces after the living hinge in a shaving direction.

2. The shaving razor of claim 1 wherein the living hinges permit the cartridges coupled to the cross pieces to pivot backward through a first arc of greater than 50 degrees, the first arc defined relative to a rest position.

3. The shaving razor of claim 1 wherein the razor blade is exactly one blade in the first cartridge, the at least one blade is exactly one blade in the second cartridge, and wherein the shaving head consists of the yolk, a plurality of cartridges including the cartridge and the second cartridge; wherein each of the cartridges of the plurality comprises the exactly one blade, exactly one base and exactly one cover.

4. The shaving razor of claim 1 wherein the yoke further comprises:

a leading platform to contact a user's skin in advance of a leading one of the razor blades.

5. The shaving razor of claim 1 wherein each cartridge comprises:

a base; and a cover coupled to the blade lengthwise along a surface of the blade and the base, the cover defining a channel that lags a cutting edge of the blade.

6. The shaving razor of claim 1 wherein each of the cartridges is discrete, the razor blade is exactly one blade, the at least one blade is exactly one blade, and all of the cartridges are oriented to shave in a same direction.

7. The shaving razor of claim 6 wherein each of the cartridges comprises no more than the exactly one blade, a cover and a base.

*8. A shaving razor for shaving hair from the skin of a user, the shaving razor comprising:*

*a plurality of blades including a first blade having a first cutting edge and a second blade having a second cutting edge; and*

*a support structure supporting the plurality of blades for shaving in a shaving direction, the support structure providing at least one skin contact surface deployed between the first cutting edge and the second cutting edge,*

*wherein the plurality of blades and the support structure define a skin contact profile in a direction of successive contact with the skin of the user when moved in the shaving direction, the skin contact profile including:*

*(i) the first cutting edge;*

*(ii) a channel defining a first region of non-contact with the skin;*

*(iii) the at least one skin contact surface;*

*(iv) a gap defining a second region of non-contact with the skin; and*

*(v) the second cutting edge.*

*9. The shaving razor of claim 8, wherein the at least one skin contact surface is integrally formed with stop members configured for retaining the first blade on the support structure.*

*10. The shaving razor of claim 8, wherein the at least one skin contact surface is integrally formed with a plate that extends away from the skin contact profile.*

*11. The shaving razor of claim 10, wherein the plate is one of a pair of plates deployed between the first blade and the second blade, the pair of plates being separated by a space.*

*12. The shaving razor of claim 8, wherein the support structure comprises an integrally-molded base member for supporting the plurality of blades.*

*13. The shaving razor of claim 12, wherein the support structure comprises at least one blade support member for supporting the first blade and at least one blade support member for supporting the second blade.*

*14. The shaving razor of claim 8, wherein the support structure comprises a base member and a cover for each of the plurality of blades, and wherein each of the plurality of blades is retained by closure of the cover against the base member.*

*15. The shaving razor of claim 8, wherein the plurality of blades further includes a third blade having a third cutting edge, and wherein the skin contact profile after the second cutting edge further includes:*

*an additional channel defining a third region of non-contact with the skin;*

*at least one additional skin contact surface provided by the support structure;*

*a gap defining a fourth region of non-contact with the skin; and*

*the third cutting edge.*

* * * * *